United States Patent [19]

Nakano et al.

[11] Patent Number: 4,983,243
[45] Date of Patent: Jan. 8, 1991

[54] METHOD OF AND APPARATUS FOR AUTOMATICALLY WINDING ADHESIVE RIBBON-LIKE MATERIAL

[75] Inventors: Shinzo Nakano, Isehara; Masaru Nakajima, Hiratsuka, both of Japan

[73] Assignee: The Yokohama Rubber Co., Ltd., Tokyo, Japan

[21] Appl. No.: 357,841

[22] Filed: May 26, 1989

[30] Foreign Application Priority Data

Sep. 29, 1988 [JP] Japan .................. 63-242495

[51] Int. Cl.$^5$ .............. B29D 30/08; B29D 30/14; B29D 30/28
[52] U.S. Cl. ................... 156/192; 156/133; 156/191; 156/406.4; 156/429; 156/526; 156/527
[58] Field of Search ............... 156/117, 397, 169, 172, 156/173, 425, 429-431, 523, 526, 527, 133, 406.4, 405.1, 191, 192

[56] References Cited

U.S. PATENT DOCUMENTS

| | | | |
|---|---|---|---|
| 3,674,584 | 7/1972 | Klein | 156/397 X |
| 3,775,219 | 11/1973 | Karlson et al. | 156/363 |
| 3,941,644 | 3/1976 | Klein et al. | 156/397 X |
| 4,371,410 | 2/1983 | Stevens | 156/397 X |
| 4,569,716 | 2/1986 | Pugh | 156/523 X |
| 4,790,898 | 12/1988 | Woods | 156/166 |

FOREIGN PATENT DOCUMENTS

| | | | |
|---|---|---|---|
| 58-191138 | 11/1983 | Japan | 156/117 |
| 60-131230 | 7/1985 | Japan | 156/397 |
| 891480 | 12/1981 | U.S.S.R. | 156/397 |
| 1265065 | 10/1986 | U.S.S.R. | 156/397 |

*Primary Examiner*—Michael W. Ball
*Assistant Examiner*—Jeff H. Aftergut
*Attorney, Agent, or Firm*—Armstrong, Nikaido, Marmelstein, Kubovcik and Murray

[57] ABSTRACT

Apparatus for automatically winding an adhesive ribbon-like material, in which a supply guide of a ribbon-like material, a clamp unit for gripping both edge portions of the ribbon-like material, at least one first pushers disposed close to the clamp unit to press the front end portion of the ribbon-like material against a building drum, a ribbon-like material cutting unit, and at least one second pushers to press the rear end portion of the ribbon-like material against the building drum are arranged in front of the building drum, and a method for automatically winding the ribbon-like material using this apparatus.

2 Claims, 4 Drawing Sheets

METHOD OF AND APPARATUS FOR AUTOMATICALLY WINDING ADHESIVE RIBBON-LIKE MATERIAL

BACKGROUND OF THE INVENTION

This invention relates to a method of and an apparatus for automatically winding an adhesive ribbon-like material, and more particularly to a method of and an apparatus for automatically winding a ribbon-like material, which consists of unvulcanized rubber-impregnated textile cords, around a drum for building a reinforcement belt for pneumatic radial tires.

In a certain kind of a pneumatic radial tire, both end portions of reinforcement belts B of steel cords inserted in a tread portion T are held with belt covering layers L of textile cords extending at a cord angle of substantially zero degree with respect to the circumferential direction of the tire as shown in FIG. 6. Owing to these belt covering layers L thus holding both end portions of the reinforcement belts B, the radially outward rising of the end portions of the reinforcement belts, which is ascribed to the centrifugal force occurring by a high speed rotation of the tire, can be prevented, so that the high-speed durability of the tire is improved.

In one of the methods of forming such a reinforcement belt structure, reinforcement belts are wound around a building drum, and then a continuous ribbon-like material consisting of unvulcanized rubber-impregnated textile cords is wound spirally around the reinforcement belts by using a winder, so as to form belt covering layers L.

However, this method requires troublesome operations, such as an operation for cutting the ribbon-like material and an operation for sticking the cut end portions of the ribbon-like material on the reinforcement belts on the building drum every starting and terminating of the winding. According to such a prior art method of this kind, the cutting of the ribbon-like material and the sticking of the end portions thereof on the reinforcement belts on the building drum are all done manually. Therefore, the cut positions of the ribbon-like material and the stuck positions of the end portions thereof vary greatly every tires, and adversely affect the quality of the tires. This results in decreasing the efficiency of operations and the productivity of the tires.

SUMMARY OF THE INVENTION

An object of the present invention is to provide a method of and an apparatus for automatically winding an adhesive ribbon-like material around a building drum.

Another object of the present invention is to provide a method of and an apparatus for automatically winding an adhesive ribbon-like material around a building drum, capable of minimizing the variations of the cut positions of the ribbon-like material and the stuck positions thereof every starting and terminating of the winding and thereby improving the operation efficiency.

In order to achieve these objects, an apparatus used for practicing the winding method according to the present invention is provided with a supply unit providing a guide for a ribbon-like material and which is movable forward and backward with respect to a building drum, and a clamp unit for gripping an end portion of a ribbon-like material fed from the supply unit. The apparatus is further provided with at least one first pushers for sticking the ribbon-like material gripped by the clamp unit on the drum in the vicinity of the clamp unit, a cutting unit of the ribbon-like material in a position downward to the rotational direction of the drum from the clamp unit, and at least one second pushers in a position downward to the rotational direction of the drum from the cutting unit.

The winding method of the adhesive ribbon-like material according to the present invention is executed by using the winding apparatus as above mentioned. First, the supply guide is moved forward to the drum not in rotation, and the ribbon-like material temporarily gripped by the clamp unit is stuck on the drum by the first pushers. The drum is then rotated to wind the ribbon-like material a required number of times around the drum as the ribbon-like material is being pulled out from the supply guide. When the ribbon-like material has been wound a required number of times around the drum, the supply guide is moved backward and the rotation of the drum is stopped, the intermediate portion of the ribbon-like material between the supply guide and the drum being gripped by the clamp unit. The portion of the ribbon-like material between the clamp unit and the drum is then cut with the cutting unit and the cut end portion thereof left on the drum is stuck on the drum by the second pushers.

Thus, the cutting of the ribbon-like material and the sticking of end portions thereof on the drum every starting and terminating of the winding can be done automatically without causing the variations of the cut positions and sticked positions to occur. This winding operation can be efficiently carried out.

DESCRIPTION OF THE PREFERRED EMBODIMENTS

Figure 1:
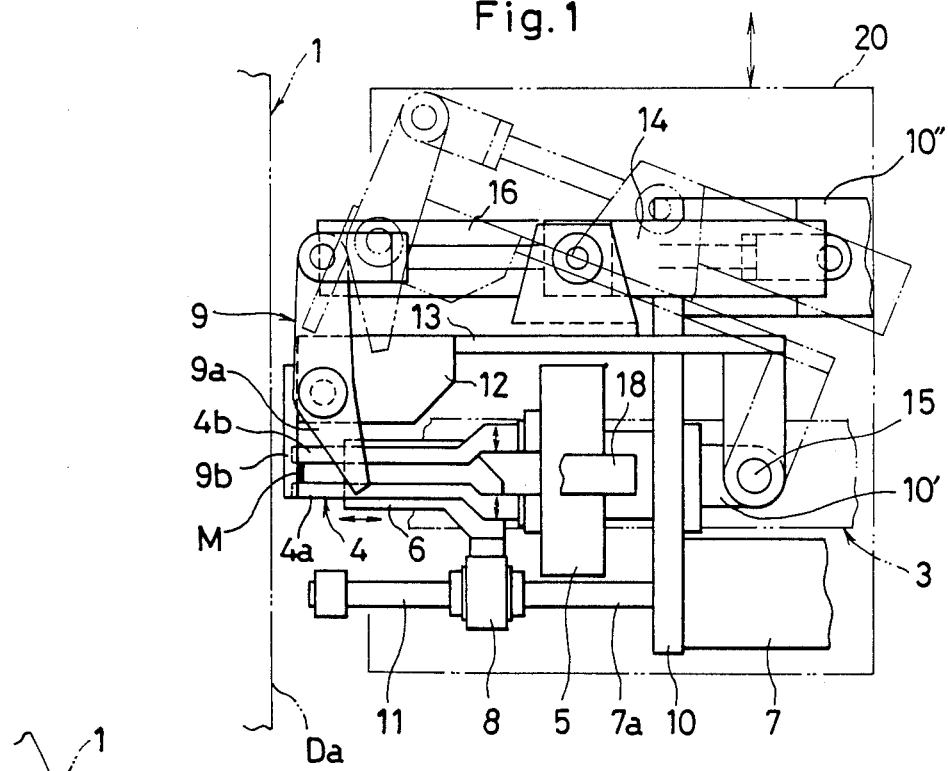
FIG. 1 is a schematic plan of an embodiment of an apparatus for winding an adhesive ribbon-like material to constitute a belt covering layer in a pneumatic radial tire, according to the present invention.
Figure 2:
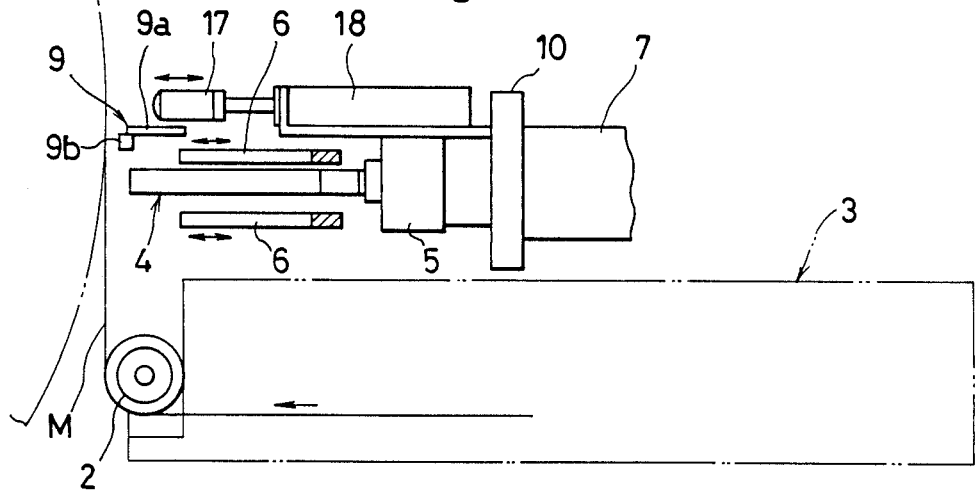
FIG. 2 is a schematic side elevation of the apparatus.

In a winding apparatus of an adhesive ribbon-like material shown in FIGS. 1 and 2, a building drum 1 has a horizontal rotary shaft to be rotated in the direction of an arrow R. A supply unit 3 having a supply guide 2 for a ribbon-like material M is provided in a position opposed to the lower portion of the outer surface Da of the drum 1, and is able to be moved forward and backward. The ribbon-like material M consists of a strip composed of a plurality of textile cords impregnated with unvulcanized rubber textile and is formed to have a small width of around 1–15 mm.

A clamp unit 4 for gripping an end portion of the ribbon-like material M fed from the supply guide 2 is provided in a position above the supply guide 2, i.e., spaced apart from it downward to the rotational direction R of the drum 1. This clamp unit 4 has a pair of horizontally extending clamp claws 4a, 4b which grip both edges of the ribbon-like material M with their tip portions spaced from each other by a distance substantially equal to the width of the material M. These clamp claws 4a, 4b can be moved laterally by an actuating cylinder 5 so that the gripping width thereof can be regulated.

Figure 3:
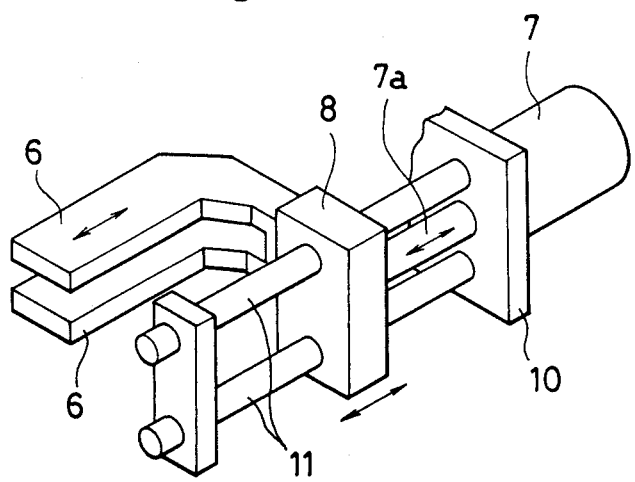
FIG. 3 is a perspective view of first pushers in the apparatus.

Two sets of first pushers 6 are provided close to the clamp unit 4 so as to be placed vertically at both sides of the clamp claws 4a, 4b. The pushers 6 are moved forward and backward with respect to the drum 1 by an actuating cylinder 7, and by their forward movement, push with their front ends the end portion of the ribbon-like material M, which is gripped by the clamp unit 4, toward the drum 1 to stick thereon. These pushers 6 are fixed to an end portion of a reciprocating rod 7a of the actuating cylinder 7 via a block 8, which is fitted slidably over guide rods 11 fixed to a frame 10, as shown in FIG. 3. In this embodiment, two pushers 6 are provided so as to be placed vertically at both sides of the clamp claws 4a, 4b. However, the number of the pushers 6 is not necessarily two; only one of them may be provided.

Figure 4:
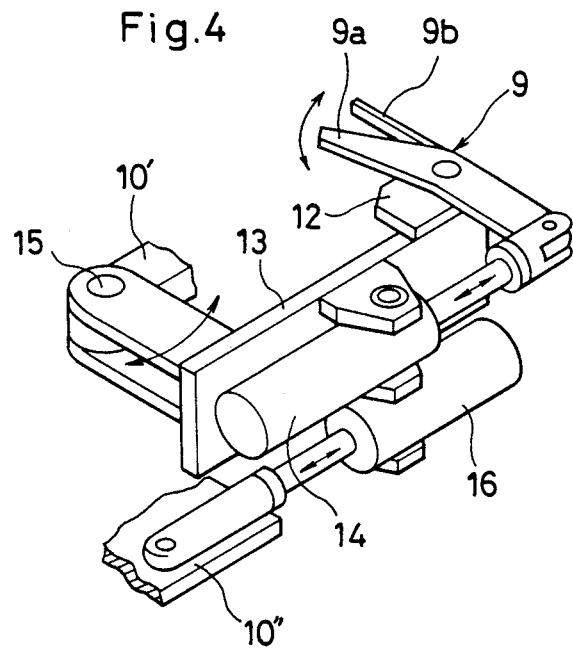
FIG. 4 is a perspective view of a cutting unit in the apparatus.

A cutting unit 9 is provided above the clamp unit 4, i.e., spaced apart from it downward to the rotational direction R of the drum 1. The cutting unit 9 is composed of a fixed blade 9b fastened to a support plate 12 and a movable blade 9a supported pivotably on the support plate 12, between which the ribbon-like material M is held to be cut. As shown in FIG. 4, an arm 13 supporting the support plate 12 is provided thereon with an actuating cylinder 14, by which the movable blade 9a is oscillated. The arm 13 is supported pivotably on a shaft 15 on a bracket 10' fixed to the frame 10, and turned as shown by a chain line in FIG. 1 by an actuating cylinder 16 connected between the arm 13 and a bracket 10" formed integrally with the frame 10. Owing to this pivotal movement of the arm 13, the movable and fixed blades 9a, 9b are retreated sideways from the free end region of the clamp unit 4.

A second pusher 17 is provided above the cutting unit 9, i.e., spaced apart from it downward to the rotational direction R of the drum 1. This pusher 17 is moved forward and backward by an actuating cylinder 18 fixed to the frame 10, and by its forward movement, pushes its front end portion to press against the drum 1. A cut end portion of the ribbon-like material left on the drum 1 is stuck on the drum 1 by the forward movement and pressing operation of the second pusher 17. The second pusher 17 may be provided two or more sets as same as the first pushers 6.

The clamp unit 4, first pushers 6, cutting unit 9 and second pusher 17 are mounted on the frame 10, while the supply guide 2 and supply unit 3 is provided to be movable forward and backward independently of the frame 10. The supply unit 3 and the frame 10 are mounted on a common traverse unit 20 so that they can reciprocate in the directions along the axis of the drum 1.

In the above-described embodiment, the supply guide 2 is provided in the lowermost position, and the clamp unit 2 and cutting unit 9 above the supply guide 2. However, when the drum is driven to be rotated downward in the direction opposite to the direction referred above, it is necessary that the supply guide 2 be provided in the uppermost position, and that the clamp unit 4 and cutting unit 9 be arranged opposite to the order mentioned above.

A method of winding the adhesive ribbon-like material M around the outer surface Da of the drum 1 by using the above-described winding apparatus will now be explained with reference to FIGS. 5A-5C.

Figure 5A:
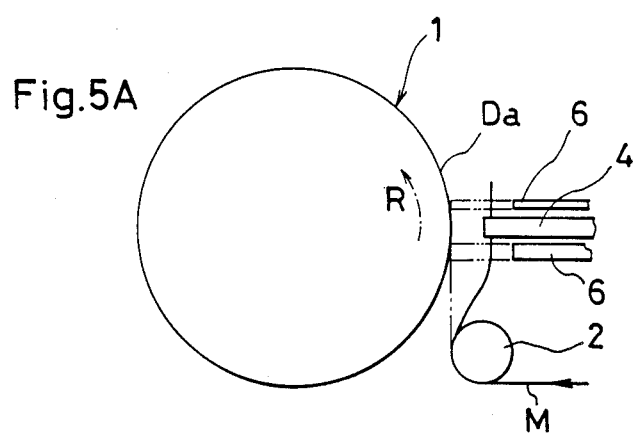
FIGS. 5A–5C illustrate the sequential steps of an operation for practicing the present invention by the apparatus.

First, the drum 1 is set in a non-rotational state, and the supply unit 3 is moved forward to a position close to the outer surface Da of the drum 1 as shown in FIG. 5A. The ribbon-like material M is pulled out from the supply guide 2, and a front end portion of the material M is gripped by the clamp unit 4. The first pushers 6 are then moved forward to the drum 1 to remove the front end portion of the material M from the clamp unit 4 by their front end portions and stick it on the outer surface Da of the drum 1 as shown by chain lines, and thereafter the first pushers 6 are moved backward to the original positions as shown by solid lines.

After the end portion of the ribbon-like material M has been stuck on the drum 1, the drum 1 is rotated. Owing to the rotation of the drum 1, the ribbon-like material M is wound around the drum 1 as it is being pulled out from the supply guide 2 as shown by a chain line in FIGS. 5A and 5B. The ribbon-like material M is also wound spirally since the traverse unit 20 is reciprocated sideways or moved laterally back and forth during the time.

Figure 5B:
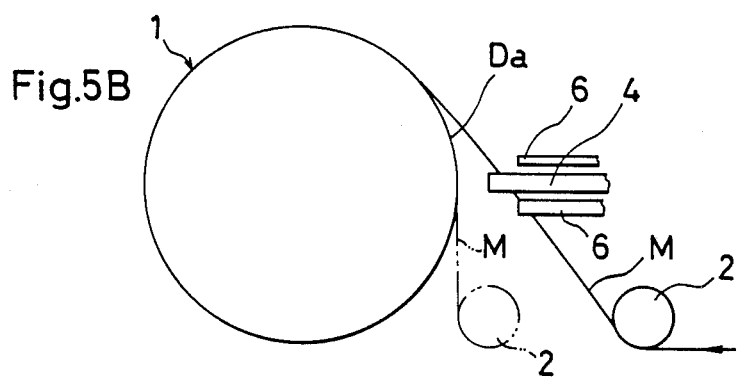

When the ribbon-like material M has thus been wound a required number of times around the drum 1, the supply guide 2 is moved backward to a position shown by a solid line in FIG. 5B. Owing to this backward movement of the supply guide 2, the intermediate portion of the ribbon-like material M running between the supply guide 2 and drum 1 is gripped by the clamp claws 4a, 4b of the clamp unit 4. At the same time, the rotation of the drum 1 is stopped.

Figure 5C:
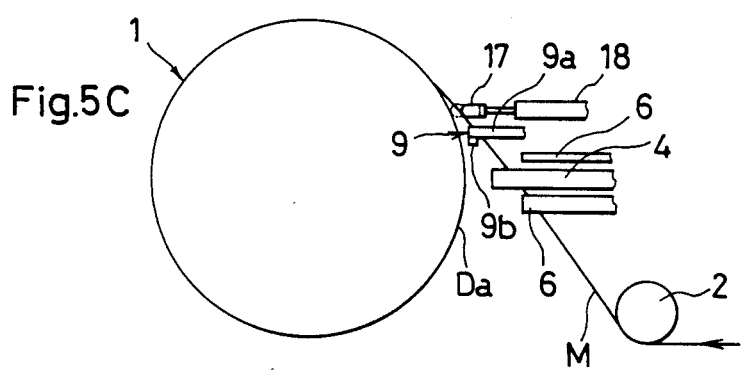
Figure 6:
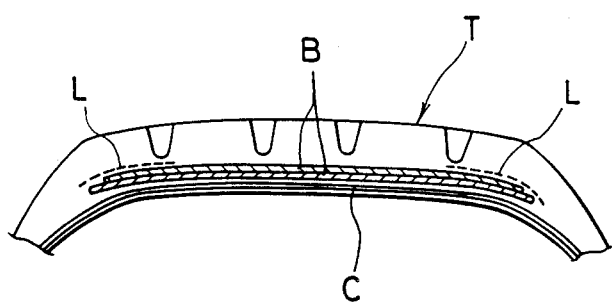
FIG. 6 is a sectional view of a tread portion of a pneumatic radial tire.

The cutter unit 9 which is a retreated position is then turned to a position facing to the clamp unit 4 as shown in FIG. 5C, to insert the ribbon-like material M extending from the clamp unit 4 to drum 1 between the movable and fixed blades 9a, 9b of the cutter unit 9 and cut it by actuating the movable blade 9a. After the ribbon-like material M has been cut, the cutting unit 9 is turned back to the original retreated position, and the second pusher 17 is moved forward to the drum 1 to stick the free end portion of the ribbon-like material M left on the side of the drum 1, on the same drum 1.

On the side of the clamp unit 4, the free end portion of the ribbon-like material M extending from the supply guide 2 is left in a gripped state as shown in FIG. 5A. Accordingly, if the above-mentioned steps are thereafter carried out repeatedly, the winding of the ribbon-like material can be done continuously.

The above-described winding operation can be carried out automatically in accordance with a program set in a control unit beforehand. Therefore, the position in which the ribbon-like material is cut and the positions in which the ribbon-like material starts and finishes to be wound can be set invariable at all times. This enables to produce high-quality of tires without variations of properties. Moreover, an efficient production of tires can be attained.

What is claimed is:

1. A method of automatically winding an adhesive ribbon-like material on an apparatus including a building drum around which a ribbon-like material is wound as the building drum is rotated in one direction, a supply unit movable forward and backward relative to the building drum for supplying the ribbon-like material to the building drum, a clamp unit opposed to the building drum and spaced from the supply unit in the direction of rotation of the building drum and comprised of a pair of left and right clamp claws with at least one of said clamp claws movable to vary a distance between said clamp claws to a width to grip both edge portions of the ribbon-like material fed from the supply unit, a pair of first pushers movably forward until pressed against the building drum and backward and spaced apart in the direction of rotation of said building drum with said left and right clamp claws interposed between the first pushers, a cutting unit spaced from the clamp unit in the direction of rotation of said building drum and having a scissors portion comprised of a fixed blade and a movable blade, said cutting unit being mounted for movement between a first position in which said scissors portion is opposed to said building drum and a second position where said scissors portion is withdrawn from said building drum, and a second pusher spaced from the cutting unit in the direction of rotation of the building drum and movable forward to press against the building drum and backward;

comprising the steps of:
(a) disposing the supply unit to a position close to the building drum and gripping an end portion of a ribbon-like material fed from the supply unit by the left and right clamp claws of the clamp unit;
(b) moving the first pushers in a forward direction to remove the end portion of said ribbon-like material gripped by said clamp claws and stick said end portion on said building drum while said drum is in a non-rotating state;
(c) rotating said building drum with said end portion stuck thereon to wind said ribbon-like material around said drum while pulling said ribbon-like material continuously from said supply unit;
(d) moving said supply unit backward when said ribbon-like material have been wound a required number of times around said building drum to grip an intermediate portion of said ribbon-like material extending from said supply unit to said drum by the clamp claws of said clamp unit;
(e) moving said cutting unit to said first position opposed to said building drum and cutting the ribbon-like material with the scissors portion between the clamp unit and the building drum; and
(f) moving the second pusher forward to stick a cut end portion of the ribbon-like material onto the building drum.

2. Apparatus for automatically winding an adhesive ribbon-like material comprising:
a building drum around which a ribbon-like material is to be wound as said building drum is rotated in one direction;
a supply unit for supplying the ribbon-like material, said supply unit being movably forward and backward relative to said building drum;
a clamp unit provided in a position spaced from said supply unit in the direction of rotation of said building drum and comprised of a pair of left and right clamp claws to grip both edge portions of said ribbon-like material fed from said supply unit with a gripping width substantially equal to a width of said ribbon-like material, at least one of said clamp claws is movable to vary a distance between said clamp claws;
a pair of first pushers provided adjacent said clamp unit and movable forward until pressed against said building drum and backward, said first pushers being spaced apart in the direction of rotation of said building drum with said left and right clamp claws interposed between said pair of first pushers;
a cutting unit provided in a position spaced from said clamp unit in the direction of rotation of said building drum, said cutting unit having a scissors portion comprised of a fixed blade and a movable blade and said cutting unit is movable between a first position in which said scissors portion is opposed to said building drum to cut said ribbon-like material extending between said clamp unit and said building drum and a second position where said scissors portion is withdrawn away from said building drum; and
at least one second pusher provided in a position spaced from said cutting unit in the direction of rotation of said building drum and movable forward until pressed against said building drum and backward.

* * * * *